US006443621B1

United States Patent
New

(10) Patent No.: US 6,443,621 B1
(45) Date of Patent: Sep. 3, 2002

(54) TILTING PAD THRUST BEARING ARRANGEMENT

(75) Inventor: Nigel Henry New, Harrow (GB)

(73) Assignee: Delaware Capital Formation Inc., Wilmington, DE (US)

( * ) Notice: Subject to any disclaimer, the term of this patent is extended or adjusted under 35 U.S.C. 154(b) by 0 days.

(21) Appl. No.: 09/763,758

(22) PCT Filed: Aug. 23, 1999

(86) PCT No.: PCT/GB99/02781
§ 371 (c)(1),
(2), (4) Date: Feb. 26, 2001

(87) PCT Pub. No.: WO00/14417
PCT Pub. Date: Mar. 16, 2000

(30) Foreign Application Priority Data

Sep. 3, 1998 (GB) .............................. 9819100

(51) Int. Cl.$^7$ ............................. F16C 17/04
(52) U.S. Cl. ................. 384/308; 384/122; 384/312
(58) Field of Search ................ 384/122, 306, 384/308, 309, 312

(56) References Cited

U.S. PATENT DOCUMENTS 3,246,936 A * 4/1966 Carle ..................... 384/308
4,026,613 A * 5/1977 Moravchik .............. 384/308
4,403,873 A * 9/1983 Gardner .................. 384/122
5,046,864 A * 9/1991 Boller .................... 384/306
5,634,725 A * 6/1997 Chester .................. 384/117
5,743,657 A * 4/1998 O'Reilly et al. ......... 384/312
6,183,138 B1 * 2/2001 New ...................... 384/308

FOREIGN PATENT DOCUMENTS

GB      1123003       8/1965

* cited by examiner

*Primary Examiner*—Christopher P. Schwartz
*Assistant Examiner*—Devon Kramer
(74) *Attorney, Agent, or Firm*—Reising, Ethington, Barnes, Kisselle, Learman & McCulloch, P.C.

(57) ABSTRACT

A tilting pad thrust bearing arrangement (10, FIG. 1(*b*)) consists of an annular backing ring (12) providing an axially facing supporting surface (11) on which an array of bearing pads (20$_1$, 20$_2$ ... 20$_i$) is carried. Each pad has a flat supported surface (22$_1$) clamped to a thin mounting ring (30) of resilient steel by a headed fastener (41$_i$) which bears on the supporting surface. The mounting ring is supported clear of the supporting surface at mounting points (32$_i$) each side of each bearing pad which define a stand-off distance between ring and supporting surface of less than the height of each fastener head so that the ring is biased and each pad is lifted at the clamping position with its edges clear of the ring, thereby permitting it to pivot about the fulcrum formed by the fastener head. The supporting surface may be an intervening resilient ring (FIGS. 5 and 6).

17 Claims, 3 Drawing Sheets

Figure 1A:
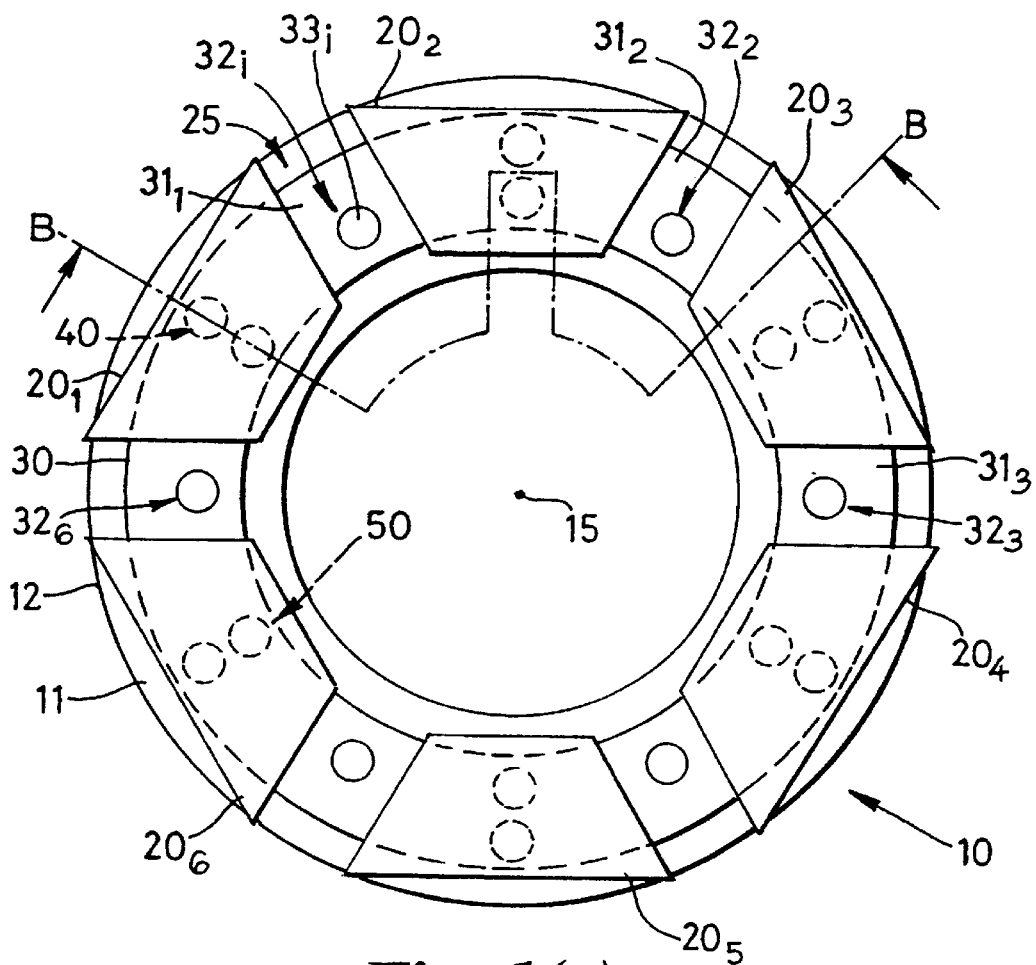

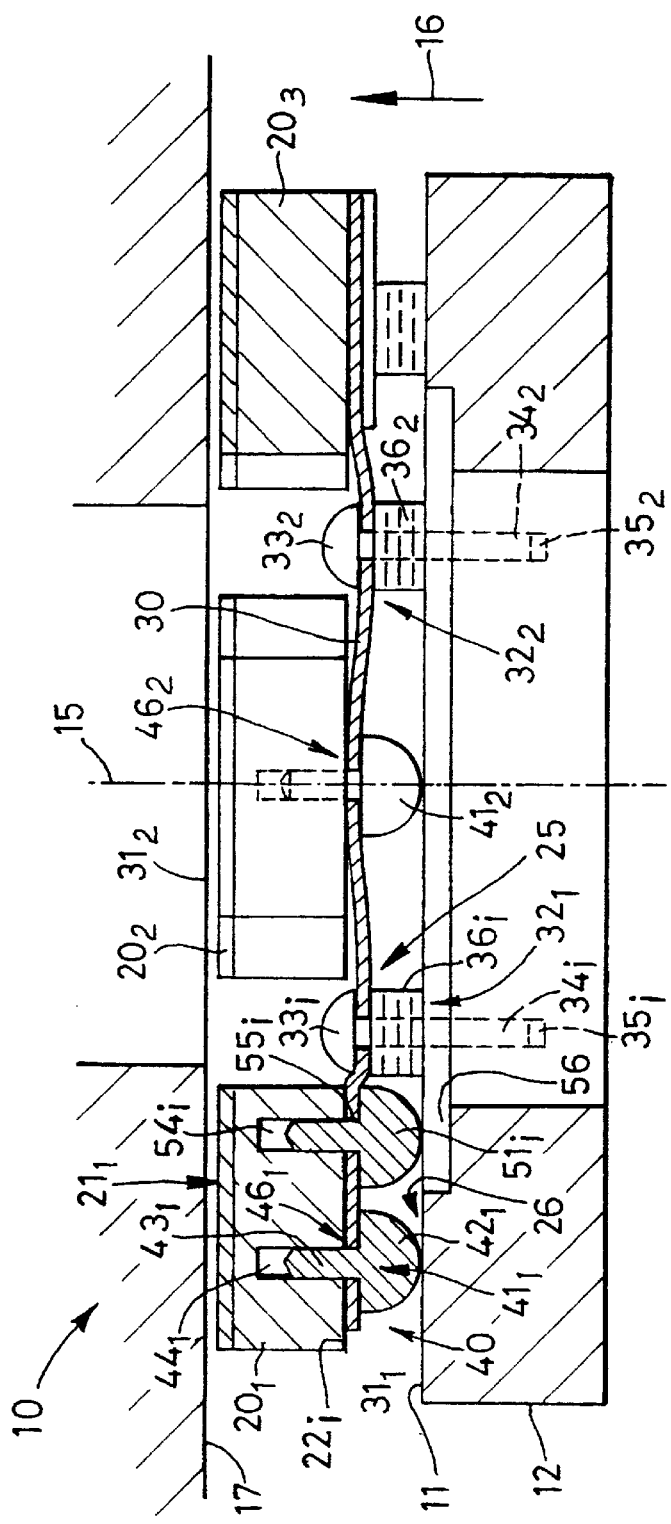
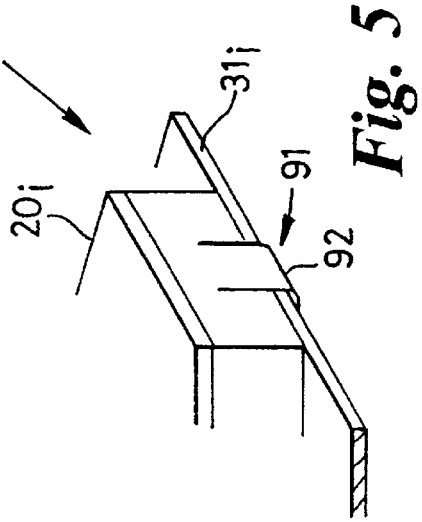
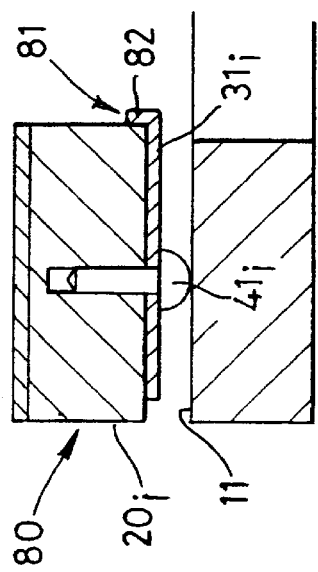
Fig. 1(b)
Fig. 4
Fig. 5

TILTING PAD THRUST BEARING ARRANGEMENT

BACKGROUND OF THE INVENTION

1. Technical Field

This invention relates to thrust bearing arrangements for supporting working surfaces, such as thrust faces of rotary shafts and the like, wherein the bearing is provided by an annular array of discrete bearing pad surfaces, and in particular relates to such thrust bearings of the tilting pad type wherein each such bearing pad surface is able to tilt with respect to the direction of relative rotation to permit the formation of a wedge-shaped hydrodynamic film of lubricant thereat.

2. Related Art

It is known to form such bearing arrangements from discrete bearing pads assembled individually with respect to a carrier and permitted to tilt by way of individual and shared elements whose assembly contributes significantly to the cost of the arrangement. It is also known to have such a thrust bearing arranged wherein the individual bearing surfaces are defined on an integral ring, as notionally separate pads joined to each other by an integral and somewhat flexible web. However, such a configuration is unduly stiff in respect of tilting unless the web is formed by expensive precision machinery, although because the web comprises the material forming the bulk of the pads and chosen for its load bearing rather than flexing properties, such construction is inherently stiff.

Examples of tilting pad thrust bearings are known from GB-A-2308162 and GB-A-1535165 which illustrate various degrees of construction complexity depending upon the property to be used to advantage.

It is an object of the present invention to provide a tilting pad thrust bearing of simple design and capable of simple and cost effective manufacture.

SUMMARY OF THE INVENTION

According to a first aspect of the present invention a tilting pad thrust bearing arrangement comprises (a) a rigid backing surface surrounding a longitudinal axis and facing a first direction along the longitudinal axis, (b) a plurality of bearing pads disposed overlying said backing surface arrayed about the longitudinal axis and each having on opposite faces thereof a substantially flat bearing surface facing along the longitudinal axis in said first direction and a substantially flat supported surface facing axially towards the backing surface, and (c) intermediate the backing surface and pads, mounting means comprising (i) support surface means, defined coaxially with respect to the backing surface, (ii) a circumferentially continuous or discontinuous annular mounting ring of incompressible resilient material coaxial with respect to the backing surface providing, having associated with each pad, a circumferentially extending sector defined between mounting points at each side of the pad spaced from the support surface thereat by a predetermined stand-off distance, (iii) and characterised by headed fastening means extending through the ring sector associated with each pad and clamping the supported surface of the pad with respect to said ring sector defining a clamped region thereof, the headed fastening means comprising at least one headed fastener having a head dimensioned to extend axially from the clamped region of the ring sector into abutment with the support surface means to bias the clamped region away from the support surface means and shaped to form, by said abutment, a pivot for the bearing pad and associated ring sector.

The headed fastening means may comprise a single fastener having a shank portion and a head portion. The fastener may be made of harder material than the support surface means.

According to a second aspect of the present invention a method of manufacturing the tilting pad thrust bearing arrangement according to the preceding paragraph comprises disposing the bearing pads in a circular array, securing the mounting ring sectors to their associated pads, disposing the bearing pads and clamping ring sector adjacent the backing surface, applying an axial clamping force between the bearing pads and backing. surface to bed each fastener head with respect to the support surface and define a substantially uniform distance between the bearing surfaces and the backing surface.

THE DRAWINGS

Figure 2:
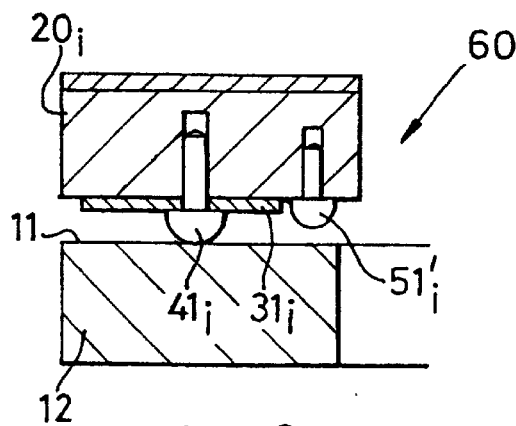
Figure 3:
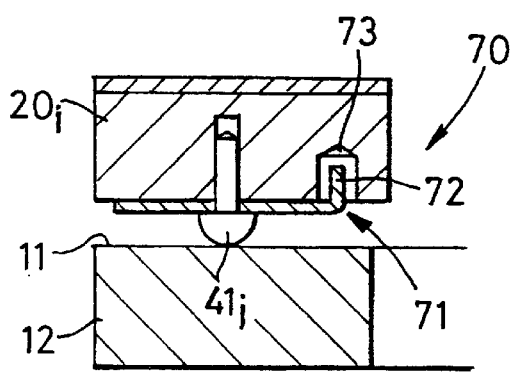
Figure 6:
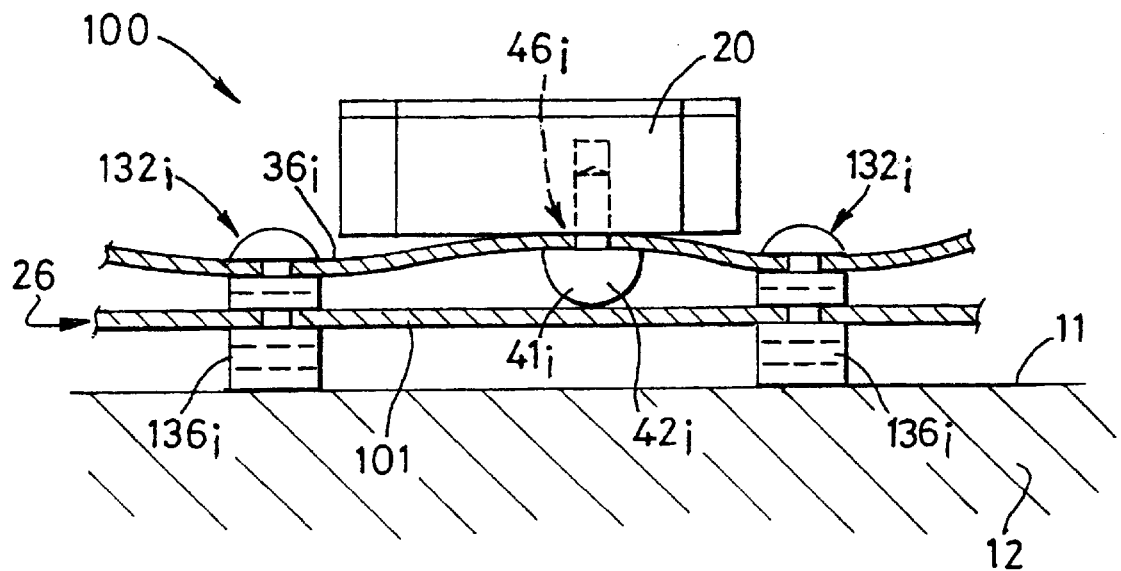
Figure 7:
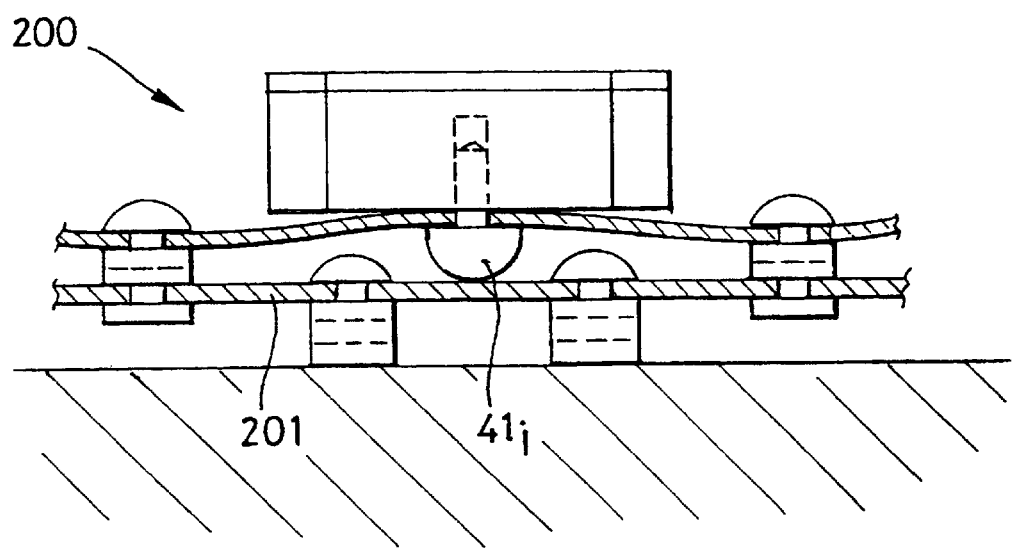

Embodiments of the invention will now be described by way of example with reference to the accompanying drawings, in which:

FIG. 1(a) is an axial end view of a first embodiment of a tilting pad thrust bearing arrangement in accordance with the present invention, FIG. 1(b) is a component sectional elevation through the arrangement of FIG. 1(a) along the line B—B thereof, FIGS. 2, 3 and 4 each show in sectional elevation parts of second, third and fourth embodiments of a tilting pad thrust bearing arrangement, generally similar to that of FIG. 1(b), but showing alternative forms of pad rotation stop means, FIG. 5 is a perspective view of part of a fifth embodiment of tilting pad thrust bearing arrangement showing a further form of pad rotation stop means, FIG. 6 is a sectional elevation of part of a sixth embodiment of tilting pad thrust bearing arrangement in accordance with the invention, showing an alternative form of supporting means, and FIG. 7 is a sectional elevation, similar to that of FIG. 6, of a seventh embodiment of tilting pad thrust bearing arrangement showing a further alternative form of supporting means.

DETAILED DESCRIPTION

Referring to FIGS. 1(a) and 1(b), a tilting pad thrust bearing arrangement 10 comprises a rigid backing surface 11 defined on a support member or carrier 12 formed either as a thick ring of mild steel or possibly as a prepared surface of a larger machine part or casing. The backing surface surrounds a longitudinal axis 15 and faces in a first direction (indicated by arrow 16) along the axis towards a working surface 17 of a machine shaft to be borne thereby. The arrangement 10 also comprises a plurality of bearing pads, identified generically as $20_i$; in this embodiment there are six pads $20_1, 20_2, \ldots 20_6$. The bearing pads overlie the backing surface 11 arrayed uniformly about the longitudinal axis 15 and each having, at opposite faces thereof, a substantially flat bearing surface $21_i$ facing axially in the direction 16 and a substantially flat supported surface $22_i$ facing axially towards the backing surface 11 and by way of which the pad is mounted.

The bearing pads are mounted with respect to the backing surface by mounting means, indicated generally at 25, disposed between the pads and backing surface.

The mounting means comprises support surface means, indicated generally at 26, defined coaxially with respect to the backing surface. In this embodiment, the support surface means is defined by the backing surface 11 itself, although this need not be so as described in other embodiments hereinafter.

The mounting means further comprises a mounting member preferably in the form of a flat annular mounting ring 30 of incompressible resilient material, conveniently spring steel, coaxial with respect to the backing surface. The ring is circumferentially continuous and notionally divided into circumferentially extending sectors $31_1, 31_2 \ldots$, associated one with each bearing pad, by mounting points $32_1, 32_2, \ldots$ at each side of the pad, that is, between adjacent pads. As with the bearing pads, it is convenient to refer to these and other replicated parts by the generic subscript "i".

Each mounting point $32_i$ comprises a headed fastener $33_i$, such as a thread forming rivet adapted to be driven into a pre-drilled hole and thereby cut a co-operating thread which locks it against removal, or a conventional screw, the shank $34_i$ of which extends through an aperture $35_i$ in the mounting ring and on which is carried a spacer $36_i$ formed by a stand-off sleeve (possibly as a stack of washers) that disposes the mounting ring spaced from the support surface backing surface (11) by a predetermined stand-off distance.

The mounting means finally includes fastening means, indicated generally at 40, extending through the ring sector $31_i$ associated with each pad and clamping the supported surface of the pad with respect to the ring sector and defining a clamped region thereof.

This is most readily illustrated by reference to the bearing pads $20_1$ and $20_2$ for different aspects. For the bearing pad $20_1$ the fastening means comprises a fastener $41_1$ of the self-tapping/thread cutting type described above which has a head portion $42_1$ and shank portion $43_1$ forced into a pre-drilled hole $44_1$ in the supported surface of the pad by way of an aperture $45_1$ in the ring sector so as to clamp the ring sector, at least in the region around the aperture, between the head $42_1$ and the supported surface of the pad and define the aforementioned clamped region $46_1$. The head portion $42_1$ is shaped as a generally hemispherical dome and dimensioned to extend away from the clamped region into abutment with the support surface means (backing surface 11) to bias the clamped region $46_1$ away from the support surface with respect to the mounting points which fix the stand-off distance of the ring sector at each side of the pad.

It will be seen from the generally radially-directed view of bearing pad $20_2$ and mounting ring sector $31_2$ that the axial bias of the clamped region $46_2$ is small but has the effect of introducing a slight 'wave' into the mounting ring such that the clamped region is at the crest thereof and the flat supported regions of the pad displaced therefrom circumferentially are slightly spaced from the mounting ring. Furthermore, the dome-shaped head of the fastener $41_2$ forms a pivot for the bearing pad and ring sector permitting it to tilt in operation about an axis in the radial direction of pad $20_2$ and working surface 17.

It will be appreciated that the amount of pad tilt required is very small and readily accommodated for a wide variety of pad sizes by a displacement at the side of the pad of about 0.1 mm and that a bias displacement due to the fastener head of this order of magnitude is adequate, although, of course, it can be chosen to suit particular requirements.

It will be appreciated that a simple dome-like fastener head provides a pivot fulcrum without recourse to specific alignment of the fastener with respect to the pad or mounting ring. However, if desired, then a fastener could be employed with a head of different contour or one that is elongated as a ridge in one direction and assembled with it extending in a radial direction. Similarly, a plurality of dome-headed or like-headed fasteners could be employed spaced radially to provide a plurality of pivot points for each pad. However, the use of a single fastener, particularly one having a shank of circular cross-sector, does mean that each pad may become rotated about the shank despite the clamping effect. To this end rotation stop means, indicated generally at 50, may be included.

In the embodiment of arrangement 10, the rotation stop means comprises a stop fastener $51_i$ in the form of second headed fastener, identical to the fastener $41_1$, which is disposed radially inwardly of the fastener $41_i$ and secured in a hole $54_i$ in the pad by way of an aperture $55_i$ in the mounting ring sector, but preferably without applying a clamping force. To prevent the head of the fastener abutting the support surface (backing surface 11) the radially inner part of the backing surface is recessed at 56.

It will be appreciated that such rotation stop means may take other forms as expedient for manufacture.

For example, referring to FIG. 2 and a sectional elevation through part of a second embodiment of tilting pad thrust bearing arrangement 60, a similar headed fastener $51'_i$ is employed as the rotation stop. It differs however in that the head is smaller and this obviates the need for recessing the backing surface. Furthermore, the fastener is disposed radially inwards of the edge of the mounting ring rather than extending by way of an aperture therein. Clearly either feature could be applied to fastener $51_i$.

Referring to FIG. 3, a third embodiment 70 has a rotation stop arrangement 71 comprising an axially extending tab or flange 72 formed at the radially inner (or outer) edge of the mounting ring sector $31_i$ and a co-operating recess 73 formed in the supported surface of the bearing pad.

FIG. 4 shows a fourth embodiment 80 in which the rotation stop arrangement 81 comprises such a tab as flange 82 disposed to overlie the radially inner (or outer) edge of the bearing pad.

Clearly the tabs 72 and 82 may be disposed other than radially in line with the clamping fastener 41 and more than one may be used for each bearing pad.

FIG. 5 shows a fifth embodiment 90 which differs in that the rotation stop means 91 comprises an axial extension 92 formed by displacing pad material at a radially inner (or outer) edge of the pad or before or after assembly with respect to the mounting ring.

In all of the above described embodiments, the mounting ring has been a circumferentially complete ring on which the sectors associated with each bearing pad are defined notionally by the various mounting apertures therethrough at the mounting points and clamping points. It will be appreciated that each bearing pad has associated therewith an actuate ring sector which extends only between adjacent mounting points at which it is clamped contiguously with an adjacent sector.

The mounting ring sectors may be formed from any suitable load. bearing and resiliently flexible material.

In the embodiments described above, the Figures show the headed fastener defining a pivot which is substantially central in respect of the circumferential length of the bearing pad. It will be appreciated that the pivot may be disposed off centre if desired.

Whereas the arrangements described in FIGS. 1(*a*) to 5 are simple in terms of components, it is possible also to employ manufacturing techniques which complement the cost effective nature of the construction.

For example, assuming the mounting ring sectors are defined by a continuous ring, the pads are arrayed with the bearing surfaces on a flat surface and the drilled supported surfaces uppermost. The apeartured mounting ring is then disposed on the supporting surfaces with the apertures aligned and the self-tapping headed portions of the aforementioned type, which are harder then the backing surface, are driven in to clamp the ring to the individual bearing pads. This sub-assembly is then placed overlying the backing surface which has been pre-drilled at the mounting points and at which the spacers are disposed. The mounting point fasteners (or temporary pegs) are then partially driven in to locate the mounting ring loosely. The arrangement is subjected to axial clamping between the bearing surfaces and backing surface to bed each fastener head/pivot with respect to the backing surface (that is, possibly indent the surface by the harder fastener material) so that all of the bearing surfaces are in a common plane and notwithstanding any variation in dimensions of the headed fasteners. Thereafter the pivot point fasteners may be driven in to the extent determined by the stand-off spacers. It should be noted that in this respect, any variation in stand-off distance between various mounting points is less important than variation in bearing pad distance from the supporting surface.

As indicated above, the support surface means is conveniently provided by the backing surface 11. However, it may be appropriate for it to take different form.

Referring to FIG. 6, which shows in sectional elevation, a part of a sixth embodiment of a tilting pad thrust bearing arrangement 100 in which those parts which have been described above are given like references. The support surface means comprises a further resilient annular ring 101 (hereinafter called the support surface ring 26) mounted spaced from the backing surface by the mounting points $132_i$ (corresponding to mounting points 32) and stand-off spacers $136_i$ corresponding to stand-off spacers 36. The head $42_i$ of the fastener $41_i$ abuts the. ring 101 between the mounting points. The resilience of the support surface ring is less than that of the mounting ring, that is, it has greater stiffness, so that the dimensions of fastener head $42_i$ biases the clamping region $46_i$ with respect to the support surface and mounting points to permit tilting of the bearing pad. However, under axial load, there is an extra degree of axial resilience to accommodate load variations. In this Figure, the headed fastener, and the pivot it defines, is shown as displaced from the centre of the pad in a circumferential direction.

A variation of such arrangement is illustrated in FIG. 7 for a seventh embodiment of tilting pad thrust bearing arrangement 200. Here the support surface ring 201 is supported with respect to the backing surface close to where the headed fastener $41_i$ abuts it and the stand-off displacement between mounting ring sector $31_i$ and support surface ring 201 is defined 'floating' with respect to the backing surface.

Such support surface ring 101 or 201 may, like the mounting ring be formed of discrete sectors.

What is claimed is:

1. A tilting pad thrust bearing construction comprising:
    a support member having a load bearing surface disposed about a longitudinal axis of said support member;
    a plurality of individual bearing pads disposed in circumferentially spaced relation about said longitudinal axis and spaced longitudinally from said load bearing surface of said support member;
    a circumferentially extending mounting member associated with each of said bearing pads and disposed between said associated bearing pad and said load bearing surface of said support member,
    at least one headed fastener extending through each of said mounting members and into the associated said bearing pads to thereby secure said bearing pads to their respective mounting members, each of said headed fasteners including a head disposed between and abutting the associated said mounting member and said load bearing surface of said support member to define a fulcrum associated with each of said bearing pads; and
    wherein each of said mounting members is fixed to said support member at mounting location circumferentially spaced from said headed fastener in such manner as to space said mounting members from their respective bearing pads at said mounting locations, thereby enabling said bearing pads to pivot relative to their respective said mounting members about said fulcrum of said headed fastener.

2. The construction of claim 1, wherein said mounting member comprises an annular mounting ring of incompressible resilient material defining circumferentially extending ring sectors between adjacent ones of said mounting locations allocated with each of said bearing pads.

3. The construction of claim 2, wherein said mounting ring is circumferentially discontinuous.

4. The construction of claim 2, wherein said support member comprises rigid backing surface.

5. The construction of claim 2, wherein said bearing pads are clamped directly to their associated ring sector.

6. The construction of claim 2, herein said mounting ring is circumferentially continuous.

7. The construction of claim 2, wherein said headed fastener includes a shank portion adjacent said head.

8. The construction of claim 2, wherein said head of said headed fastener is dome-shaped.

9. The construction of claim 2, wherein each said headed fastener is press-fit secured in self-topping, self locking engagement within a hole of said associated bearing head.

10. The construction of claim 2, wherein each of said bearing pad is supported against rotation about an axis of said headed fastener associated therewith.

11. The construction of claim 10, wherein each of said bearing pad includes a anti-rotation fastener adjacent said headed fastener to prevent said rotation of said bearing pad.

12. The construction of claim 10, wherein said anti-rotation fastener is supported for radially inward displacement relative to said headed fastener.

13. The construction of claim 10, wherein said headed fastener is supported in spaced, non-contacting relation to said support member.

14. The construction of claim 10, wherein said mounting member includes a flange associated with each of said bearing pads and confronting said bearing pads to support said bearing pads against rotational movement relative to said mounting member.

15. The construction of claim 1, wherein said head of said headed fastener is fabricated of a material that is relatively harder than that of said load bearing surface of said support member.

16. The construction of claim 1, wherein said heads of said headed fasteners are equally spaced from said bearing surface of said support member.

17. A method of manufacturing a tilting pad thrust bearing device, comprising:
    mounting a plurality of bearing pads to a backing surface of a mounting member in circumferentially spaced relation by at least one headed fastener associated with each bearing pad;

pressing heads of the headed fasteners axially against a bearing surface of an adjacent support member to bed each head into the bearing surface to define a substantially uniform distance between the bearing surface and the backing surface; and securing the mounting member to the support member at mounting locations circumferentially spaced from the headed fasteners to space the mounting member from the bearing pads at the mounting locations to permit pivoting of the bearing pads in the circumferential direction about a fulcrum of the head of the headed fasteners.

* * * * *